United States Patent
Johnstone (10) Patent No.: US 11,970,049 B2
(45) Date of Patent: Apr. 30, 2024

(54) SYSTEM FOR CONTROLLING CABIN DUST

(71) Applicant: Nicholas Johnstone, Cornubia (AU)

(72) Inventor: Nicholas Johnstone, Cornubia (AU)

(73) Assignee: BREATHESAFE PTY LTD, Ellen Grove (AU)

(*) Notice: Subject to any disclaimer, the term of this patent is extended or adjusted under 35 U.S.C. 154(b) by 520 days.

(21) Appl. No.: 16/444,388

(22) Filed: Jun. 18, 2019

(65) Prior Publication Data
US 2020/0031205 A1    Jan. 30, 2020

Related U.S. Application Data

(60) Provisional application No. 62/686,137, filed on Jun. 18, 2018.

(51) Int. Cl.
*B60H 3/06* (2006.01)
*B01D 46/02* (2006.01)
(Continued)

(52) U.S. Cl.
CPC .......... *B60H 3/0658* (2013.01); *B60H 1/008* (2013.01); *B60H 1/246* (2013.01); *B60H 3/0608* (2013.01);
(Continued)

(58) Field of Classification Search
CPC .... B60H 3/0658; B60H 3/0608; B60H 1/008; B60H 1/246; B60H 1/00985;
(Continued)

(56) References Cited

U.S. PATENT DOCUMENTS 4,344,356 A * 8/1982 Casterton ........... B62D 33/0617
454/158
6,758,739 B1 * 7/2004 Sangwan ............. B60H 3/0085
454/75
(Continued)

FOREIGN PATENT DOCUMENTS

JP    H 09-202134    8/1997
JP    3588887 B2    11/2004
(Continued)

OTHER PUBLICATIONS

WO 2019/243886 Search Report for PCT/IB2019/000647, dated Dec. 11, 2019.
WO 2019/243886 Written Opinion for PCT/IB2019/000647, dated Dec. 11, 2019.

*Primary Examiner* — Steven B McAllister
*Assistant Examiner* — Charles R Brawner (57) ABSTRACT

A system is described for controlling dust in a cabin, such as a cabin or cabinet in a piece of mobile plant equipment. The system includes an air circulation unit comprising an air flow passageway extending from a return air intake in communication with the cabin interior to one or more conduits in communication with the cabin interior and a circulation fan in communication with the air flow passageway, wherein the circulation fan can cause air from the cabin interior to pass through a filter and to be redelivered to the cabin interior. A control system is in communication with the air circulation unit. The control system includes a controller and a detector, wherein the controller receives a input signal from the detector related to a condition in the cabin and wherein the controller generates an output signal in response to the input signal, the output signal being delivered to the air circulation unit to control the operation thereof. The detector may, for example, be a pressure sensor and/or a dust (Continued)

particle sensor. In another version, the control system alternatively or additionally controls a positive pressure unit.

16 Claims, 4 Drawing Sheets

(51) Int. Cl.
  *B60H 1/00* (2006.01)
  *B60H 1/24* (2006.01)
(52) U.S. Cl.
  CPC ...... *B01D 46/02* (2013.01); *B60H 2003/0683* (2013.01)
(58) Field of Classification Search
  CPC ............ B60H 1/00828; B60H 1/00378; B60H 2003/0683; B01D 46/02
  USPC ........................................................... 454/75
  See application file for complete search history.

(56) References Cited

U.S. PATENT DOCUMENTS

| | | | |
|---|---|---|---|
| 2005/0282486 A1* | 12/2005 | Takeda | B60N 2/56 454/158 |
| 2006/0118290 A1* | 6/2006 | Klassen | B60H 1/00378 165/202 |
| 2013/0203333 A1* | 8/2013 | Amura | B60H 3/0608 454/137 |
| 2017/0113517 A1* | 4/2017 | Kwon | B01D 46/429 |
| 2018/0178619 A1* | 6/2018 | Guitart Corominas | B60H 1/00735 |
| 2018/0288932 A1* | 10/2018 | Winkel | B60H 1/248 |
| 2019/0017312 A1* | 1/2019 | Hovel | E05F 15/72 |

FOREIGN PATENT DOCUMENTS

| | | |
|---|---|---|
| KR | 10-2000-0039646 | 7/2000 |
| KR | 10-2017-0035481 | 3/2017 |

* cited by examiner

SYSTEM FOR CONTROLLING CABIN DUST

PRIORITY

The present application claims the benefit of domestic priority based on U.S. Provisional Patent Application 62/686,137 filed on Jun. 18, 2018, the entirety of which is incorporated herein by reference.

BACKGROUND

Mobile plant equipment for industrial applications, such as mining and drilling equipment, has become ubiquitous in operations throughout the modern world. There is an ever-increasing global demand for ore, oil, gas, and other resources. This need must be constantly balanced against the potential dangers associated with the processes, some of which are only being fully realized in recent times and some of which are still being evaluated for harmful impact.

The plant equipment generates dust and/or works in an environment where dust is present. Many of the hazardous effects of this dust have been well documented. Mobile plant equipment operates in mine sites, drilling sites, landfill sites, construction sites, chemical processing sites, shipping ports, farming operations, and the like. Individuals exposed to the work process created dust have been known to experience silicosis, asbestosis, coal worker's pneumoconiosis, and/or other ailments. Operators in and near the dust, such as individuals in the operator cabin of mining and drilling machinery need to avoid as much dust as possible to maximize their health and safety.

The dust is hazardous not only to humans but also to equipment. Due to both the size and the abrasive qualities of work process dust, it also has an impact on sensitive machine equipment, in particular electrical and moving components, autonomous control system components, electrical terminals, and wiring. Indeed, impact on autonomous systems is a growing concern. These issues can be compounded in work sites where the dust particles are created from materials which are corrosive or can become electrically charged. An operator cabin in a piece of plant equipment can include control devices within the cabin that can be damaged by dust and reduce their reliability and/or increase their need for maintenance procedures. In addition, cabinets, such as an electrical cabinet, can be present on mining and drilling machinery. These cabinets can often house important equipment that needs to be protected from dust. For example, these cabinets can house electrical controls and devices and autonomous drive systems on self-driving machines.

There is therefore a need for controlling dust in a cabin, including a cabinet. There is a further need for an improved manner of controlling the amount of dust in a cabin of a piece of mobile plant equipment. There is a further need for a system for controlling cabin dust that will enhance operational health and safety, reduce equipment downtime and maintenance, and/or improve the operation of a system associated with the cabin by allowing the volume intake, filter condition, and unit integrity to be consequently and/or actively monitored.

SUMMARY

The present invention satisfies these needs. In one aspect of the invention, dust in a cabin is controlled.

In another aspect of the invention, a system is provided for controlling the amount of dust in a cabin in a piece of mobile plant equipment.

In another aspect of the invention, a system for controlling dust in a cabin comprises a dust sensor and a controller responsive to the dust sensor.

In another aspect of the invention, the presence of a sensor and controller for the measurement and management of airborne dust particles within an enclosed environment, such as a heavy mobile plant operator cabin or electrical cabinet, will enhance operational health and safety In another aspect of the invention, the presence of a sensor and controller for the measurement and management of airborne dust particles within an enclosed environment, such as a heavy mobile plant operator cabin or electrical cabinet, will reduce equipment downtime and maintenance.

In another aspect of the invention, the presence of a sensor and controller for the measurement and management of airborne dust particles within an enclosed environment, such as a heavy mobile plant operator cabin or electrical cabinet, will improve the operation of a system associated with the cabin or cabinet by allowing the volume intake, filter condition, and unit integrity to be consequently and/or actively monitored.

In another aspect of the invention, a system for controlling dust in a cabin, the cabin comprising a shell separating a cabin interior from an external environment containing dust, comprises a positive pressure unit comprising a channel extending from an air intake to the cabin interior and a positive pressure fan in communication with the channel, wherein the positive pressure fan can cause air from the external environment to pass from the air intake to the internal environment to pressurize the cabin; and a control system in communication with the positive pressure unit, the control system comprising a controller and a detector, wherein the controller receives a input signal from the detector related to a condition in the cabin and wherein the controller generates an output signal in response to the input signal, the output signal being delivered to the positive pressure unit to control the operation thereof.

In another aspect of the invention, a system for controlling dust in a cabin, the cabin comprising a shell separating a cabin interior from an external environment containing dust, comprises an air circulation unit comprising an air flow passageway extending from a return air intake in communication with the cabin interior to one or more conduits in communication with the cabin interior and a circulation fan in communication with the air flow passageway, wherein the circulation fan can cause air from the cabin interior to pass through a filter and to be redelivered to the cabin interior; and a control system in communication with the air circulation unit, the control system comprising a controller and a detector, wherein the controller receives a input signal from the detector related to a condition in the cabin and wherein the controller generates an output signal in response to the input signal, the output signal being delivered to the air circulation unit to control the operation thereof.

In another aspect of the invention, a system for controlling dust in a cabin, the cabin comprising a shell separating a cabin interior from an external environment containing dust, comprises a positive pressure unit comprising a channel extending from an air intake to the cabin interior and a positive pressure fan in communication with the channel, wherein the positive pressure fan can cause air from the external environment to pass from the air intake to the internal environment to pressurize the cabin; an air circulation unit comprising an air flow passageway extending from a return air intake in communication with the cabin interior to one or more conduits in communication with the cabin interior and a circulation fan in communication with the air flow passageway, wherein the circulation fan can cause air from the cabin interior to pass through a filter and to be redelivered to the cabin interior; and a control system in communication with the positive pressure unit and the air circulation unit, the control system comprising a controller, a first detector, and a second detector, wherein the controller receives a first input signal from the first detector related to a first condition in the cabin and wherein the controller generates a first output signal in response to the first input signal, the first output signal being delivered to the positive pressure unit to control the operation thereof, and wherein the controller receives a second input signal from the second detector related to a second condition in the cabin and wherein the controller generates a second output signal in response to the second input signal, the second output signal being delivered to the air circulation unit to control the operation thereof.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to a system for controlling dust within an enclosed environment. In particular, the invention relates to a system for monitoring and controlling the dust in a cabin associated with a piece of mobile plant equipment. Although the system is illustrated and described in the context of being useful for mining and drilling operator and/or equipment cabins, the present invention can be useful in other instances. Accordingly, the present invention is not intended to be limited to the examples and embodiments described herein.

Figure 1:
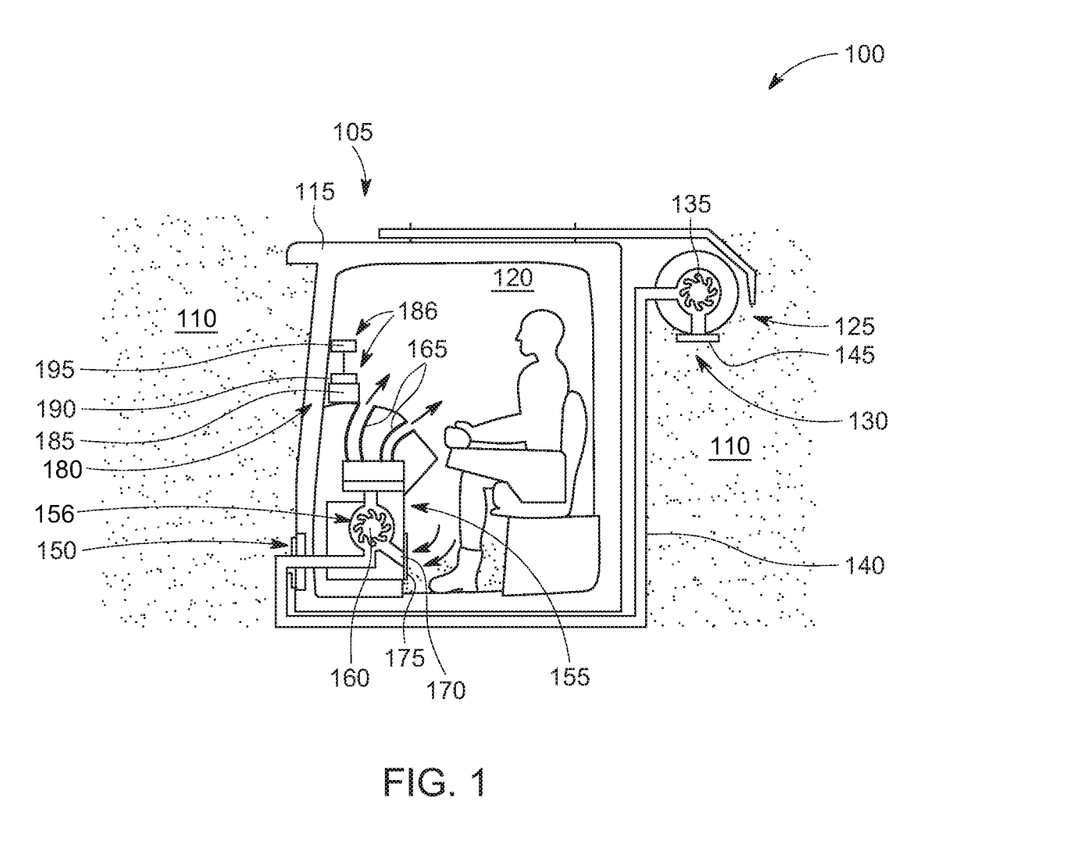
FIG. 1 is a schematic partially sectional side view of a system for controlling cabin dust according to a version of the invention.

FIG. 1 shows a system for controlling cabin dust 100. The system for controlling cabin dust 100 is particularly useful in association with a cabin 105 associated with heavy equipment, such as mobile plant equipment including for example mining and/or drilling equipment. By cabin it is meant any compartment within or in proximity to the heavy equipment or any compartment within an area that is exposed to dust generated by the heavy equipment or otherwise generated in proximity to the heavy equipment and/or cabin. The cabin can include an operator cabin large enough for a human operator, an operational cabin that is smaller and can be controlled remotely, and a cabinet that houses particular pieces of equipment such as electrical and/or computer equipment. Mobile plant equipment can be used for mining, drilling, or otherwise processing in environments including but not limited to mine sites, drilling sites, landfill sites, construction sites, chemical processing sites, shipping ports, farming operations, and the like. During the process of mining, drilling or otherwise processing these sites, the cabin 105 is operated in an external environment 110 where large amounts of dust are generated. By dust it is meant any work process created particles. The cabin 105 can include a shell 115 that defines an interior 120. A human operator, operational equipment, and/or electrical equipment within the interior 120 is shielded from the environment 110 by the shell 115. If undesirable amounts of the dust particles are present within the cabin 105, the dust particles can be harmful to the human operator and/or to the equipment and systems within the cabin 105.

In order to help prevent or reduce dust particles from penetrating into the interior 120 of the cabin 105, a positive pressure unit 125 is provided, as shown in FIG. 1. The positive pressure unit 125 includes an air intake 130 that takes in air from the external environment 110. A positive pressure fan 135, such as a brushless motor fan, causes air from the external environment 110 to be taken in and to pass through a channel 140. In one particular version, the positive pressure fan 135 is a variable speed brushless motor with a centrifugal precleaner. A filter 145 is provided at the air intake 130 to prevent or reduce the amount of dust particles that are taken in by the air intake 130. The filter 145 can be any filter that removes at least a portion or percentage of the dust particles from the air, such as a HEPA filter, a charcoal filter, a nano diesel particulate matter filter, and the like. The channel 140 leads to a cabin inlet 150 where clean, hazard free, pressurized air may be delivered into the interior 120 of the cabin 105. The delivery of air causes a positive pressure to be built up and/or maintained with the interior 120 of the cabin 105 so that the air pressure in the cabin 105 is greater than the air pressure in the external environment 110.

The positive pressure unit 125 creates a sufficient amount of air pressure in the interior 120 of the cabin 105 to prevent dust particles from seeping into the cabin 105. Without the positive pressure, dust particles can migrate from the external environment 110 through gaps or seems in the shell 115 of the cabin 105. The inlet 150 may be a vent that delivers air directly to the interior 120. In the version shown in FIG. 1, the inlet 150 delivers the air directly into an air circulation unit 155. The air circulation unit 155 includes an air flow passageway 156. A circulation fan 160, such as a brushless motor, drives air through the air flow passageway 156 and into the interior 120 through one or more conduits 165 so that the air is blown into the interior 120 of the cabin 105. Optionally, the air circulation unit 155 can include a heating and/or cooling unit to help maintain a desired temperature within the cabin 105. The air flow passageway 156 extends from a return air intake 170 to the one or more conduits 165. The return air intake 170 receives air from the interior 120 by the suction action caused by the circulation fan 160 and/or the positive pressure in the interior 120 caused by the circulation fan 160 and/or the positive pressure fan 135. The return air intake 170 within the interior 120 can have a filter 175 to help prevent the circulation of any dust particles that have made their way into the cabin 105. The filter can be a HEPA filter or the like.

In one version, a control system 180 is provided that monitors and maintains the conditions in the interior 120 of the cabin 105. The control system 180 can comprise a controller 185 that receives one or more signals related to a condition in the cabin 105 and that can generate an output signal in response to that condition. The control system 180 can include one or more detectors 186. For example, in one version, the one or more detectors 186 can include a pressure sensor 190 that senses the air pressure in the interior 120 of the cabin 105. The pressure sensor 190 is in communication with the controller 185 and provides a signal to the controller in relation to the air pressure. The controller is in communication with and can control the operation of the positive pressure fan 135 of the positive pressure unit 125 so that the amount of air being delivered to the cabin 105 can be adjusted in relation to the detected pressure from the pressure sensor 190. When the pressure is detected to be below a desired level, the controller 185 can cause the positive pressure unit 125 to increase the amount of air being delivered to the cabin 105, such as by increasing the speed of the positive pressure fan 135. Similarly, when the pressure is detected to be above a desirable level, the controller 185 can cause the positive pressure unit 125 to decrease the amount of air being delivered to thereby lower the pressure in the cabin 105.

The pressure within the cabin 105 can be maintained at a desirable pressure. In one version, the pressure within the cabin 105 is maintained at between about 20 Pascals and 70 Pascals. In one particular version, the pressure within the cabin 105 is maintained at between about 25 Pascals and about 65 Pascals or between about 25 Pascals and about 35 Pascals. In another particular version, the pressure in the cabin 105 is maintained at a pressure greater than about 30 Pascals or at a pressure between about 30 Pascals and about 60 Pascals. In another particular version, the pressure within the cabin 105 is maintained at a pressure that is at least about 5 Pascals above the pressure of the external environment 110 or that is at least about 10 Pascals above the pressure of the external environment 110. In another version, the pressure within the cabin 105 is maintained at a selectable pressure, such as at about 10 Pascals, at about 20 Pascals, at about 30 Pascals, at about 40 Pascals, at about 50 Pascals, or at about 60 Pascals. Pressure in the cabin 105 will drop if a window or door has been opened, for example. The controller 185 can also log and/or transmit this data, including all pressures, alarms, key indicators, and preset metrics for monitoring and/or analysis. This data can be transmitted independently through communications infrastructure or in constitute with the machine's vehicle management system (VMS). When the pressure in the cabin 105 drops below a predetermined level, a visual and/or audible alarm may be activated.

In one version, the controller 185 is a rugged, industrial controller, designed to monitor, record, transmit, and/or intelligently control the cabin pressure inside the interior 120 of the cabin 105. Efficient cabin pressure management ensures harmful dust particles and toxic fumes cannot ingress into the cabin 105 and be inhaled by an operator and/or damage equipment. In one version, the controller 185 has a built-in 14 bit digital pressure sensor 190 that can accurately measure pressures from about −250.0 Pascals to about +250.0 Pascals with repeatable accuracy. An alarm set point can be set via a user keypad or other input device and can range from about 0.0 Pascals to about 100.0 Pascals. If the pressure falls below the set point, a light, an audible signal and/or other altering device can be activated, either locally or remotely. The alarm can be manually deactivated and/or can remain on until the controller 185 has caused the cabin pressure to return to a safe level.

In another version of the invention, as also shown in FIG. 1, the system for controlling cabin dust 100 also or alternatively include a different detector 186. For example, in one version, the one or more detectors 186 can comprise a dust sensor 195 as part of the control system 180. The dust sensor 195 can sense the presence of dust and/or particles in the air and/or their concentration and are often referred to as dust particle sensors. The dust sensor 195 is also in communication with the controller 185 and can alert the controller 185 when the amount of dust particles present in the interior 120 of the cabin 105 is above a predetermined level. The dust sensor 195 can be a separate detector or can be incorporated into the controller 185. The dust sensor 195 can be mounted anywhere in the interior 120 of the cabin 105, preferably at a height level that is approximately the same as the head of a human operator if a human operator is present in the cabin 105 and/or the height of equipment that is to be protected.

The dust sensor 195 may be any detector that is capable of measuring the amount and/or concentration of dust and/or particles in the cabin 105. In one version, the dust sensor 195 uses an infrared and/or laser optical sensor. Other dust sensing systems may alternatively or additionally be used. The system used may vary according to operational functionality, type, sensitivity, accuracy, and/or site or operations requirements, including dust or particle properties.

The dust sensor 195 is in communication with the controller 185 and provides a signal to the controller 185 in relation to the air quality, i.e. the quantity and/or quality of dust particles in the cabin 105. The controller 185 is in communication with and can control the operation of the circulation fan 160 and/or the positive pressure fan 135. In one particular version, the controller 185 controls the operation of the circulation fan 160 of the air circulation system 155 so that the amount of air being filtered within the cabin 105 can be adjusted in relation to the detected dust particle level from the dust sensor 195. When the level of dust particles is detected to be above a desired level, the controller 185 can cause the air circulation system 155 to increase the amount of air being exchanged within the cabin 105. In like manner, when the level of dust particles in the cabin 105 is detected to be below a desirable level, the controller 185 can cause the air circulation system 155 to decrease the amount of air being exchanged by decreasing the speed of the circulation fan 160. This decrease in fan speed will also correspondingly reduce the noise in the cabin 105, reducing system decibel levels. This can be a significant factor when considering operator's comfort, concentration, and long-term exposure to noise levels. It also significantly reduces system maintenance requirements while increasing component and filter life. In one version, the desirable level of dust is less than about 10 mg/m$^3$, or less than about 5 mg/m$^3$, or less than about 0.1 mg/m$^3$, as calculated on a time weighted average basis per element and regulated by local, national, or industry standards and as further discussed below.

Figure 2:
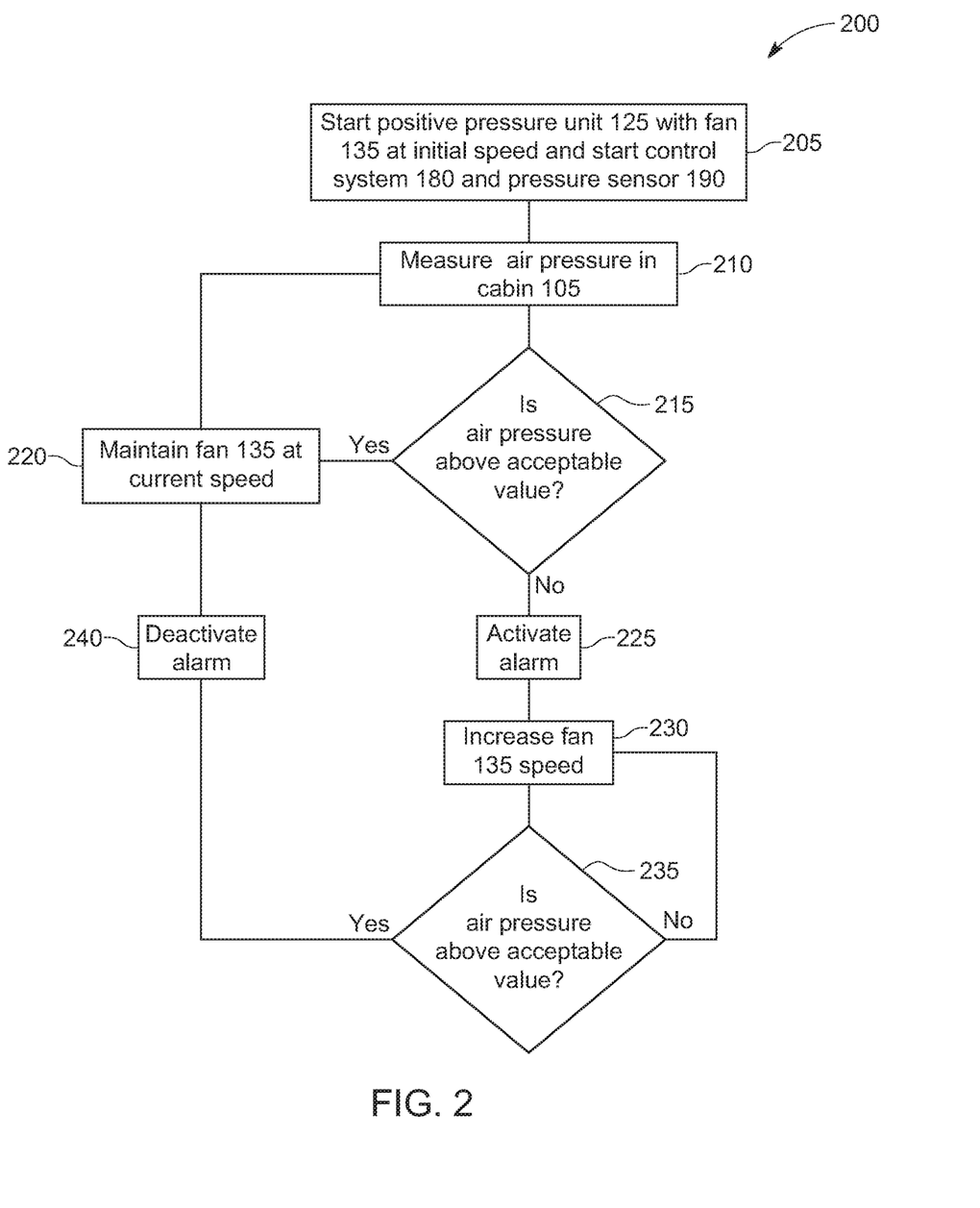
FIG. 2 is a flow chart illustrating an operational process of a system for controlling cabin dust.

FIG. 2 illustrates an operational process 200 for the control system 180. The system is started 205, and the controller 185 and pressure sensor 190 are booted up and the positive pressure unit 125 is started with the positive pressure fan 135 operating at an initial set speed and optionally with the circulation fan 160 operating at an initial speed. During operation of the mining and/or drilling equipment, the pressure sensor 190 measures 210 the air pressure in the interior 120 of the cabin 105 and records and/or transmits the measurement. A signal is sent to the controller 185 indicating the measured pressure, and the controller 185 can determine 215 if the pressure is within an acceptable range, such as by being above an acceptable and predetermined value. The acceptable value can be preprogrammed or set by using the user input controls. If the pressure is sufficiently high, the speed of the positive pressure fan 135 is maintained 220 or can optionally be reduced, and the pressure is again measured 210 either periodically or continuously. If the pressure falls below the acceptable level, an alarm is optionally activated 225, and the speed of the positive pressure fan 135 is increased 230. After a certain period of time, or continuously, the pressure is again monitored 235. If the pressure remains unacceptably low, the fan speed of the positive pressure fan 135 can again be increased 230. Alternatively, the measurement may again be taken after a period of time without further increasing the fan speed. Once the pressure rises above the acceptable level, the alarm, if any, is deactivated, the fan speed of the positive pressure fan 135 is maintained 220, or optionally reduced, and the regular monitoring process continues. Alternatively, the fan speed can be returned to its initial setting once the pressure returns to an acceptable level.

Figure 3:
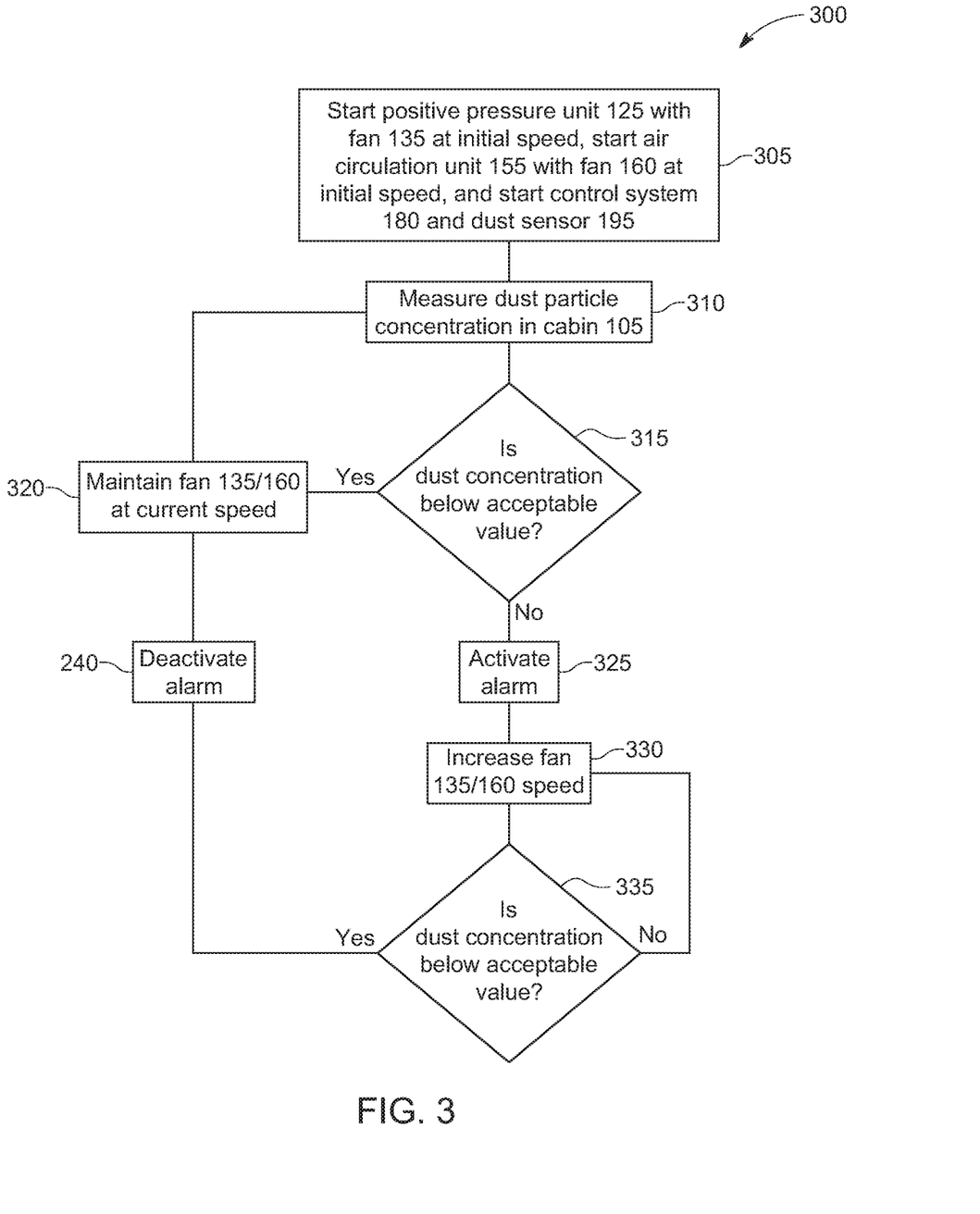
FIG. 3 is a flow chart illustrating another operational process of a system for controlling cabin dust.

FIG. 3 illustrates an operational process 300 for the control system 180 according to another version. The system is started 305, and the controller 185 and dust sensor 195 are booted up and the positive pressure unit 125 and/or air circulation unit 155 is started with the positive pressure fan 135 operating at an initial set speed and/or the circulation fan 160 operating at an initial speed. During operation of the mining and/or drilling equipment, the dust sensor 195 measures 310 the concentration of dust particles in the interior 120 of the cabin 105 and records and/or transmits the measurement. A signal is sent to the controller 185 indicating the measured concentration, and the controller 185 determines 315 if the concentration is below an acceptable and predetermined value. The acceptable value can be preprogrammed or set by using the user input controls. If the concentration is sufficiently low, the speed of the circulation fan 160 and/or positive pressure fan 135 is maintained 320 or can optionally be reduced, and the dust concentration is again measured 310 either periodically or continuously. If the concentration rises above the acceptable level, an alarm is optionally activated 325, and the speed of the circulation fan 160 and/or positive pressure fan 135 is increased 330. After a certain period of time, or continuously, the dust concentration is again measured 335. If the dust concentration remains unacceptably high, the fan speed of one or both of the fans 135, 160 can again be increased 330. Alternatively, the measurement may again be taken after a period of time without further increasing the fan speed. Once the dust concentration drops below the acceptable level, the alarm, if any, is deactivated, the fan speed is maintained 320, or optionally decreased, and the regular monitoring process continues. Alternatively, the fan speed can be returned to its initial setting once the dust concentration returns to an acceptably low level. This reduction in fan speed correspondingly reduces associated system decibel levels.

Figure 4:
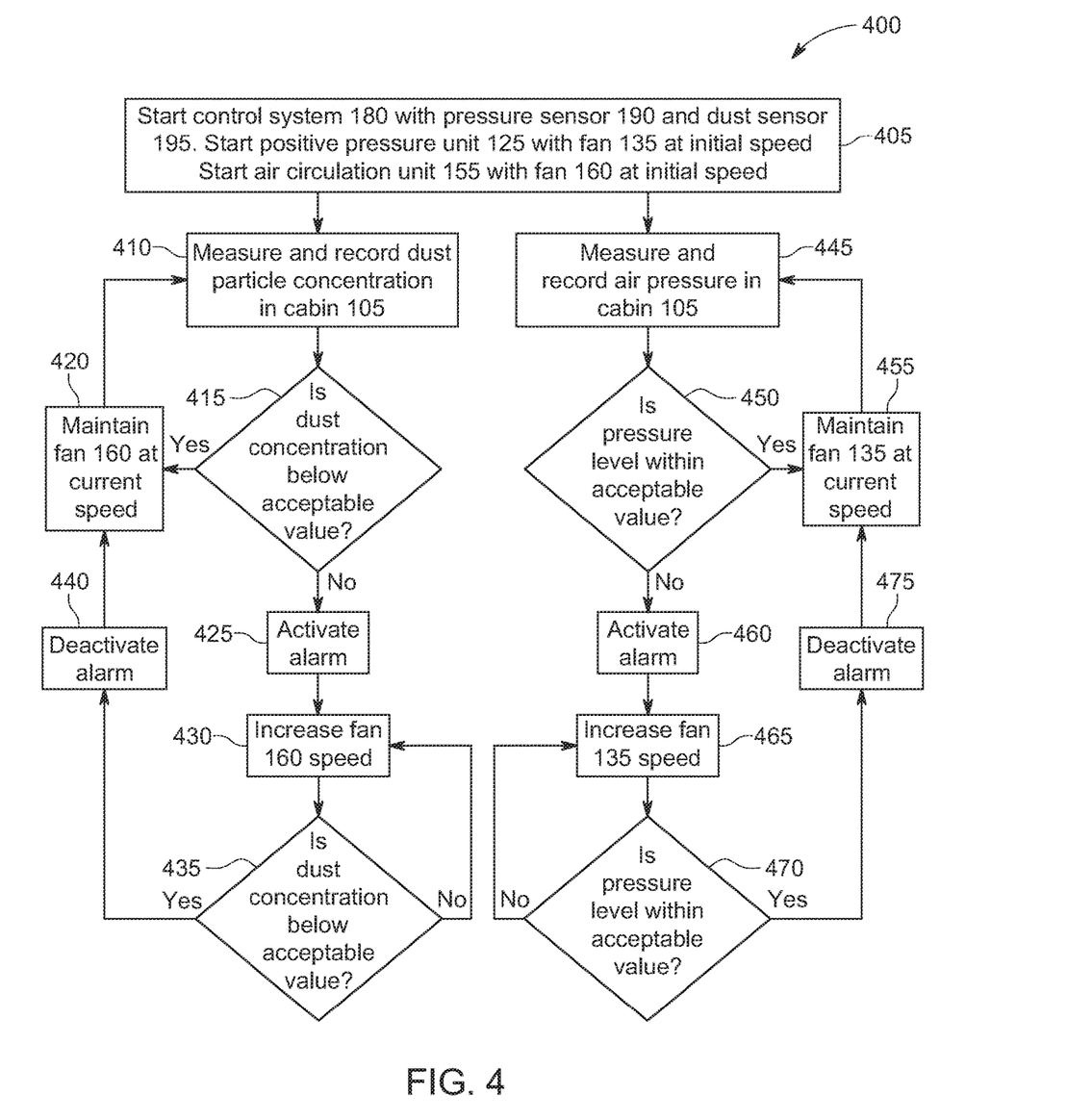
FIG. 4 is a flow chart illustrating another operational process of a system for controlling cabin dust.

FIG. 4 illustrates another operational process 400 for the control system 180 where the controller 185 is used to control the cabin in relation to both pressure and dust level. The system is started 405, and the controller 185, pressure sensor 190, and dust sensor 195 are booted up and the positive pressure unit 125 is started with the circulation fan 160 operating at an initial set speed. During operation of the mining and/or drilling equipment, the dust sensor 195 measures 410 the concentration of dust particles in the interior 120 of the cabin 105 and records and/or transmits the measurement. A signal is sent to the controller 185 indicating the measured concentration, and the controller 185 determines 415 if the concentration is below an acceptable and predetermined value. The acceptable value can be preprogrammed or set by using the user input controls. If the concentration is sufficiently low, the speed of the circulation fan 160 is maintained 420 or can optionally be reduced, and the dust concentration is again measured 410 either periodically or continuously. If the concentration falls rises above the acceptable level, an alarm is optionally activated 425, and the speed of the circulation fan 160 is increased 430. After a certain period of time, or continuously, the dust concentration is again measured 435. If the dust concentration remains unacceptably high, the fan speed can again be increased 430. Alternatively, the measurement may again be taken after a period of time without further increasing the fan speed. Once the dust concentration drops below the acceptable level, the alarm, if any, is deactivated, the circulation fan 160 speed is maintained 420, and the regular monitoring process continues. Alternatively, the fan speed can be returned to its initial setting once the dust concentration returns to an acceptably low level. This additionally reduces both system decibel levels as well as wear and tear.

While the controller 185 in the version of FIG. 4 is controlling the circulation fan 160 in relation to the dust level, the controller 185 can also be controlling the positive pressure fan 135 in relation to the pressure. During operation of the mining and/or drilling equipment, the pressure sensor 190 measures 445 the air pressure in the interior 120 of the cabin 105 and records and/or transmits the measurement. A signal is sent to the controller 185 indicating the measured pressure, and the controller 185 determines 450 if the pressure is within an acceptable range of values. The acceptable values can be preprogrammed or set by using the user input controls. If the pressure is acceptable, the speed of the positive pressure fan 135 is maintained 455 or optionally can be reduced, and the pressure is again measured 445 either periodically or continuously. If the pressure falls outside the acceptable level, an alarm is optionally activated 460, and the speed of the positive pressure fan 135 is increased 465. After a certain period of time, or continuously, the pressure is again measured 470. If the pressure remains unacceptably high, the positive pressure fan 135 speed can again be increased 465. Alternatively, the measurement may again be taken after a period of time without further increasing the fan speed. Once the pressure is within an acceptable range, the alarm, if any, is deactivated, the positive pressure fan 135 speed is maintained 455, and the regular monitoring process continues. Alternatively, the fan speed can be returned to its initial setting once the pressure returns to an acceptably low level.

Acceptable dust levels can vary depending on the nature of the dust particles, the jurisdiction, and/or changing scientific evidence. Acceptable dust particle exposure limits are typically calculated on a time weighted average basis per element. The time weighted average of some common hazardous substances are 0.1 mg/m$^3$ for crystalline silica, 10 mg/m$^3$ for coal dust; 5 mg/m$^3$ for respirable dust. The controller 185 can be appropriately programmed to maintain the dust particles below these or any other desirable level.

The presence of a sensor and controller for the measurement and management of airborne dust particles within an enclosed environment, such as a heavy mobile plant operator cabin or electrical cabinet, will reduce equipment downtime and maintenance. This has significant impact from a reliability and MTBF perspective, assisting scheduling, operations planning, and part procurement.

The system for controlling cabin dust 100 can be applied to any enclosed cabin or space. For example, the system can be used in a vehicle or a building.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Therefore, any appended claims should not be limited to the description of the preferred versions contained herein and should include all such alterations, permutations, and equivalents as fall within the true spirit and scope of the present invention.

What is claimed is:

1. A system for controlling dust in a cabin, the cabin comprising a shell separating a cabin interior from an external environment containing dust, the system comprising:
   a positive pressure unit comprising a channel extending from an air intake to a cabin inlet into the cabin interior and a positive pressure fan in communication with the channel, wherein the positive pressure fan can cause air from the external environment to pass from the air intake and through a first filter to the internal environment to pressurize the cabin;
   an air circulation unit comprising a circulation fan in an air flow passageway, the air flow passageway receiving air from the positive pressure unit and from a return air intake in communication with the cabin interior and expelling air through one or more conduits in communication with the cabin interior, wherein the circulation fan can cause air from the cabin interior to pass through a second filter, be mixed with air from the positive pressure unit, and be redelivered to the cabin interior; and
   a control system in communication with the positive pressure unit or the air circulation unit, the control system comprising a controller and one or more detectors, wherein at least one of the one or more detectors comprises a dust sensor and wherein the controller receives an input signal from the dust sensor related to the dust level in the cabin and wherein the controller generates an output signal in response to the input signal, the output signal being delivered to the positive pressure unit or the air circulation unit to control the operation thereof, and wherein when the dust level exceeds a predetermined value, the controller causes the positive pressure unit to increase the fan speed of the positive pressure fan.

2. A system according to claim 1, wherein the pressure in the cabin is maintained at a level above 30 Pascals.

3. A system according to claim 1, wherein the pressure in the cabin is maintained at a level from 30 Pascals to 60 Pascals.

4. A system according to claim 1, wherein the pressure in the cabin is maintained at a pressure greater than the pressure in the external environment by at least 10 Pascals.

5. A system according to claim 1, wherein the first filter is positioned on the opposite side of the positive pressure fan than the cabin inlet.

6. A system according to claim 1, wherein at least one of the one or more detectors comprises a pressure sensor and wherein an input signal of the pressure sensor is generated that is related to the sensed air pressure in the cabin.

7. A system according to claim 6, wherein when the pressure drops below a predetermined value, the controller causes the positive pressure unit to increase the fan speed of the positive pressure fan.

8. A system according to claim 1 wherein the predetermined value is a selectable dust level.

9. A system for controlling dust in a cabin, the cabin comprising a shell separating a cabin interior from an external environment containing dust, the system comprising:
   a positive pressure unit comprising a channel extending from an air intake to the cabin interior and a positive pressure fan in communication with the channel, wherein the positive pressure fan can cause air from the external environment to pass from the air intake, through a first filter, and to the internal environment to pressurize the cabin;
   an air circulation unit comprising an air flow passageway extending from a return air intake in communication with the cabin interior to one or more conduits in communication with the cabin interior and a circulation fan in communication with the air flow passageway, wherein the circulation fan can cause air from the cabin interior to pass through a second filter and to be redelivered to the cabin interior; and
   a control system in communication with the positive pressure unit and the air circulation unit, the control system comprising a controller, a pressure detector, and a dust detector, wherein the controller receives a pressure input signal from the pressure detector related to a pressure condition in the cabin and wherein the controller generates a pressure output signal in response to the pressure input signal, the pressure output signal being delivered to the positive pressure unit to control the operation thereof, and wherein the controller receives a dust level input signal from the dust detector related to a dust level condition in the cabin and wherein the controller generates a dust level output signal in response to the dust level input signal, the dust level output signal being delivered to the air circulation unit to control the operation thereof, and wherein when the dust level condition exceeds a predetermined value, the dust level output signal from the controller causes the positive pressure unit to increase the fan speed of the positive pressure fan.

10. A system according to claim 9 wherein when the pressure in the cabin drops below a predetermined value, the controller causes the positive pressure unit to increase the fan speed of the positive pressure fan.

11. A system for controlling dust in a cabin, the cabin comprising a shell separating a cabin interior from an external environment containing dust, the system comprising:
   a positive pressure unit comprising a channel extending from an air intake to a cabin inlet into the cabin interior and a positive pressure fan in communication with the channel, wherein the positive pressure fan can cause air from the external environment to pass from the air intake and through a first filter to the internal environment to pressurize the cabin;

an air circulation unit comprising a circulation fan in an air flow passageway, the air flow passageway receiving air from the positive pressure unit and from a return air intake in communication with the cabin interior and expelling air through one or more conduits in communication with the cabin interior, wherein the circulation fan can cause air from the cabin interior to pass through a second filter, be mixed with air from the positive pressure unit, and be redelivered to the cabin interior; and a control system in communication with the positive pressure unit, the control system comprising a controller and a plurality of detectors, wherein a first detector comprises a pressure sensor and wherein the controller receives an input signal from the pressure sensor related to the pressure level in the cabin and wherein the controller generates an output signal in response to the input signal, the output signal being delivered to the positive pressure unit to control the operation thereof, and wherein when the pressure level falls below a predetermined value, the controller causes the positive pressure unit to increase the fan speed of the positive pressure fan, and wherein a second detector comprises a second sensor for detecting a second condition other than pressure and related to the level of dust in the cabin and wherein the controller receives an input signal from the second sensor related to the second condition and wherein the controller generates an output signal in response to the input signal, the output signal being delivered to the positive pressure unit to control the operation thereof while the positive pressure unit is activated.

12. A system according to claim 11 wherein the second detector comprises a dust sensor and wherein the controller receives an input signal from the dust sensor related to the dust level in the cabin and wherein the controller generates an output signal in response to the input signal, the output signal being delivered to the positive pressure unit to control the operation thereof, and wherein when the dust level exceeds a predetermined value, the controller causes the positive pressure unit to increase the fan speed of the positive pressure fan.

13. A system according to claim 11, wherein the pressure in the cabin is maintained at a level above 30 Pascals.

14. A system according to claim 11, wherein the pressure in the cabin is maintained at a level from 30 Pascals to 60 Pascals.

15. A system according to claim 11, wherein the pressure in the cabin is maintained at a pressure greater than the pressure in the external environment by at least 10 Pascals.

16. A system according to claim 11, wherein the first filter is positioned on the opposite side of the positive pressure fan than the cabin inlet.

* * * * *